No. 768,498. PATENTED AUG. 23, 1904.
A. L. WILLARD.
COLLAR.
APPLICATION FILED JAN. 25, 1904.
NO MODEL.

WITNESSES
Hubert A. Howson
F. W. Wright

INVENTOR
Alfred Leopold Willard
by Howson and Howson
his attorneys

No. 768,498.

Patented August 23, 1904.

UNITED STATES PATENT OFFICE.

ALFRED LÉOPOLD WILLARD, OF PARIS, FRANCE.

COLLAR.

SPECIFICATION forming part of Letters Patent No. 768,498, dated August 23, 1904.

Application filed January 25, 1904. Serial No. 190,506. (No model.)

*To all whom it may concern:*

Be it known that I, ALFRED LÉOPOLD WILLARD, a citizen of the Republic of France, residing in the Rue Bérenger, city of Paris, France, have invented certain new and useful Improvements in Collars and Cuffs, of which the following is a specification.

This invention has for its object to produce a new finish for the edge of a collar, cuff, or like article adapted for use in a starched condition, such a finish that the edge of the multiply body will not have to be turned in and yet all tendency to ravel and fray will be overcome, and at the same time a collar will be produced which may have its extreme edge of the same thickness as the body.

In carrying out this invention I take the several plies of fabric which are to form the body of the collar and entirely surround their outer edge with a cord of a diameter substantially that of the thickness of the collar, stitching the cord to the body of the collar. When such a collar has been washed, starched, and ironed, it will present a smooth edge of substantially the same thickness as the body of the collar, and the cord and stitches will only be discernible upon close examination.

The annexed sheet of drawings, which forms a part of the specification, represents such a collar.

Figure 1:
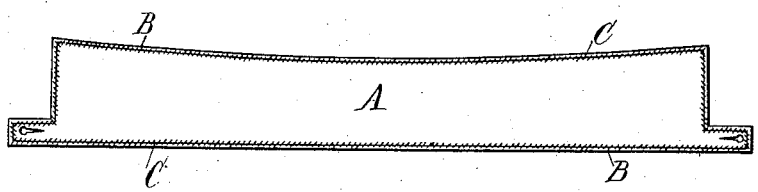
Figure 2:
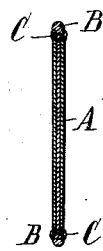

Figure 1 is a view in elevation. Fig. 2 is a transverse section.

A is the body of the collar, which in the example is formed of three pieces of fabric fastened together by starching, but which, as it will be understood, may be constituted of one single piece or any number of pieces.

B is the round cord of substantially circular section, which surrounds exactly the outline of the body and is fastened to it by a suitable stitching C.

It must be understood that although the description of the invention is made for a loose collar the invention must be applied without departing from its spirit for the manufacture of cuffs, plain breast-pieces of shirts, collars for children, and similar linen goods.

I claim as my invention—

1. A collar or analogous article composed of a body of a number of plies of fabric, each ply terminating at the edge of said body, and an uncovered cord surrounding said body on the outside of the said edge and stitched to said body.

2. A collar or analogous article composed of a body of a number of plies of fabric, each ply terminating at the edge of said body and an uncovered cord of a diameter substantially equal to the thickness of the body surrounding said body on the outside of the said edge and stitched to said body.

In testimony whereof I have signed my name to this specification in the presence of two subscribing witnesses.

ALFRED LÉOPOLD WILLARD.

Witnesses:
 GUSTAVE DUMONT,
 HANSON C. COXE.